(12) United States Patent
Marklevitz et al.

(10) Patent No.: US 7,464,946 B2
(45) Date of Patent: Dec. 16, 2008

(54) COLLAPSIBLE STORAGE DEVICE/ENTERTAINMENT CENTER

(75) Inventors: Christopher A. Marklevitz, Belmont, MI (US); Frederick A. Marklevitz, Columbus, OH (US); James L. Marklevitz, Coopersville, MI (US)

(73) Assignee: Marco Enterprises LLC, Coopersville, MI (US)

( * ) Notice: Subject to any disclaimer, the term of this patent is extended or adjusted under 35 U.S.C. 154(b) by 446 days.

(21) Appl. No.: 11/099,770

(22) Filed: Apr. 6, 2005

(65) Prior Publication Data

US 2006/0226618 A1    Oct. 12, 2006

(51) Int. Cl.
B62B 1/04    (2006.01)

(52) U.S. Cl. .................. 280/47.26; 312/265.5

(58) Field of Classification Search .............. 280/47.26, 280/47.34, 47.35, 79.11, 79.2, 79.3, 47.19; 312/108, 240, 257.1, 258, 265.5, 317.3
See application file for complete search history.

(56) References Cited

U.S. PATENT DOCUMENTS

| | | | |
|---|---|---|---|
| 2,351,610 A | 6/1944 | Hamberg | |
| 2,366,677 A | 1/1945 | Rosenthal | |
| 2,548,639 A | 4/1951 | Weamer | |
| 2,642,330 A | 6/1953 | Armour | |
| 3,069,216 A | 12/1962 | Vaeth | |
| 3,201,186 A | 8/1965 | Noonan et al. | |
| 3,491,820 A | 1/1970 | Ostling | |
| 4,178,047 A | 12/1979 | Welch | |
| 4,195,889 A | 4/1980 | Coyne | |
| 4,288,132 A | 9/1981 | Znamirowski et al. | |
| 4,417,774 A | 11/1983 | Bevan et al. | |
| 4,435,028 A * | 3/1984 | Rivkin | 312/258 |
| 4,436,353 A | 3/1984 | Tucker | |
| 4,572,593 A | 2/1986 | Takamizawa et al. | |
| 4,579,401 A | 4/1986 | Mears | |
| 4,747,644 A | 5/1988 | Gallery et al. | |
| 4,848,859 A | 7/1989 | Edmonds et al. | |
| 5,020,867 A * | 6/1991 | McManus | 312/314 |
| 5,213,351 A | 5/1993 | Chen | |
| 5,363,775 A | 11/1994 | Simpson | |
| 5,372,075 A | 12/1994 | Graf | |
| 5,425,545 A * | 6/1995 | McCusker | 280/30 |
| 5,727,857 A | 3/1998 | Smith | |
| 5,810,505 A * | 9/1998 | Henriott et al. | 403/230 |
| 6,039,418 A | 3/2000 | Thomas | |
| 6,039,419 A | 3/2000 | Brown et al. | |
| 6,053,587 A * | 4/2000 | Boerder | 312/249.12 |
| 6,135,583 A | 10/2000 | Simon et al. | |
| 6,460,950 B2 | 10/2002 | Spitzer et al. | |
| 6,520,514 B2 * | 2/2003 | Clegg | 280/47.26 |
| 6,845,871 B1 * | 1/2005 | Culp | 211/186 |
| 2004/0090156 A1 | 5/2004 | Kananantakul | |

* cited by examiner

*Primary Examiner*—Frank B Vanaman
(74) *Attorney, Agent, or Firm*—Van Dyke, Gardner, Linn & Burkhart, LLP

(57) ABSTRACT

A collapsible storage device provides an easily transportable appliance that is preferably constructed to function as an entertainment center. The various components of the collapsible storage device may be conveniently stored within the stowage unit of the device when the device is disassembled. The inclusion of wheels and a handle on the stowage unit enable simple movement when disassembled and the inclusion of a locking door provides the ability to safely secure valuables within the internal cavity of the stowage unit. The various connection methods used to assemble the collapsible storage device enable the device to be easily assembled by hand without the use of complex tools.

37 Claims, 7 Drawing Sheets

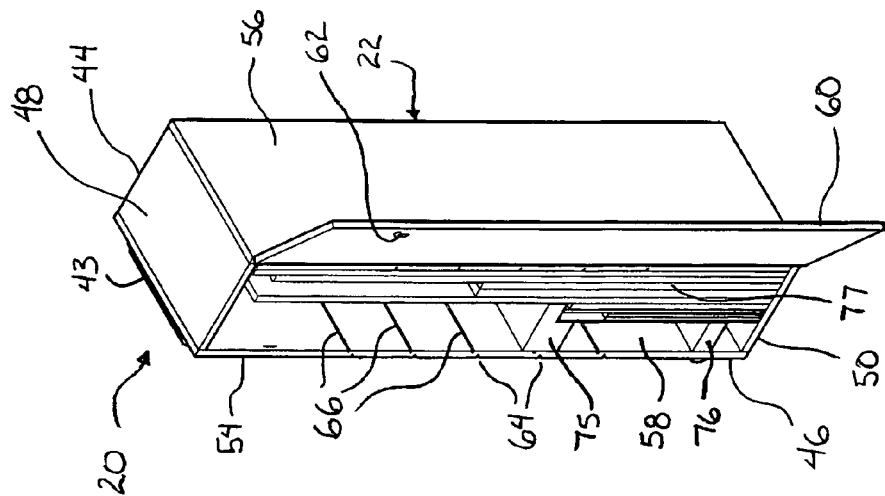
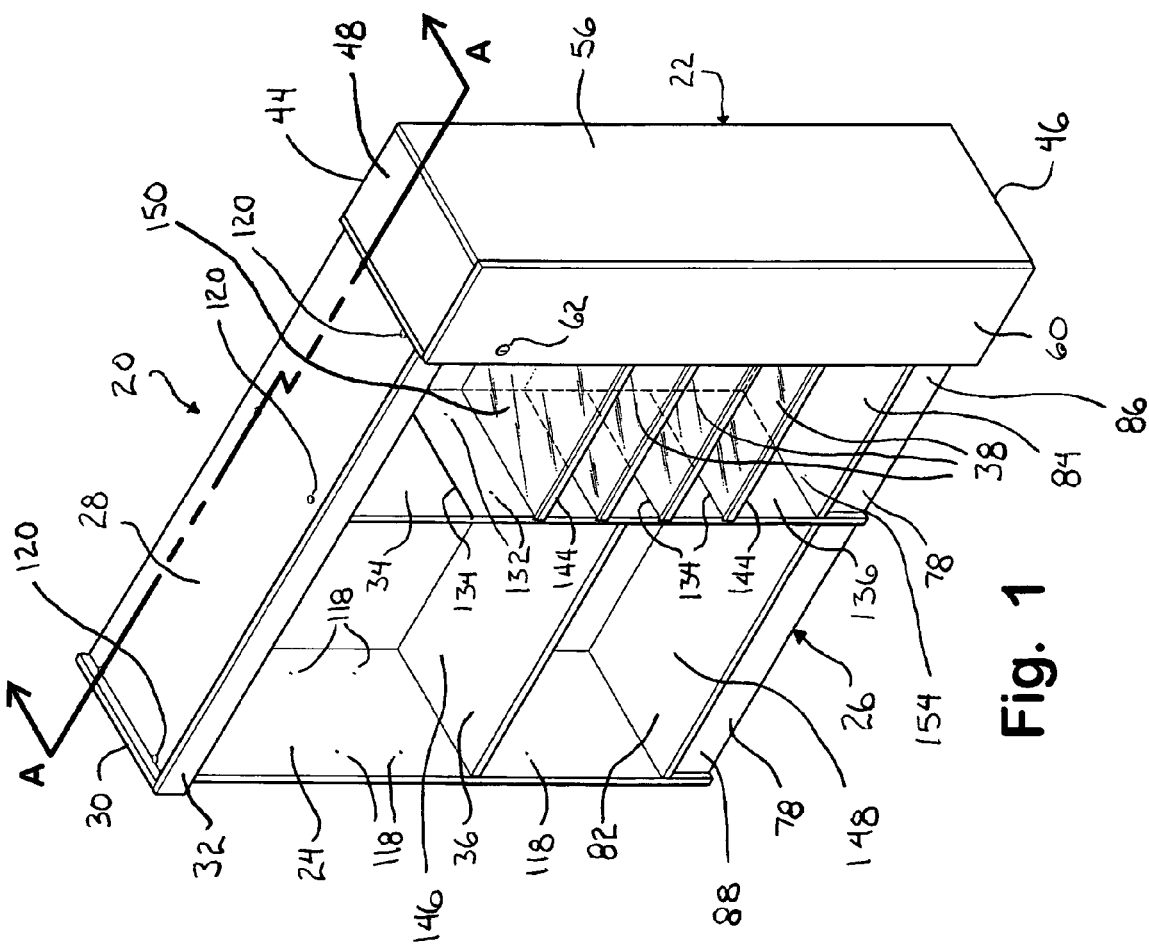

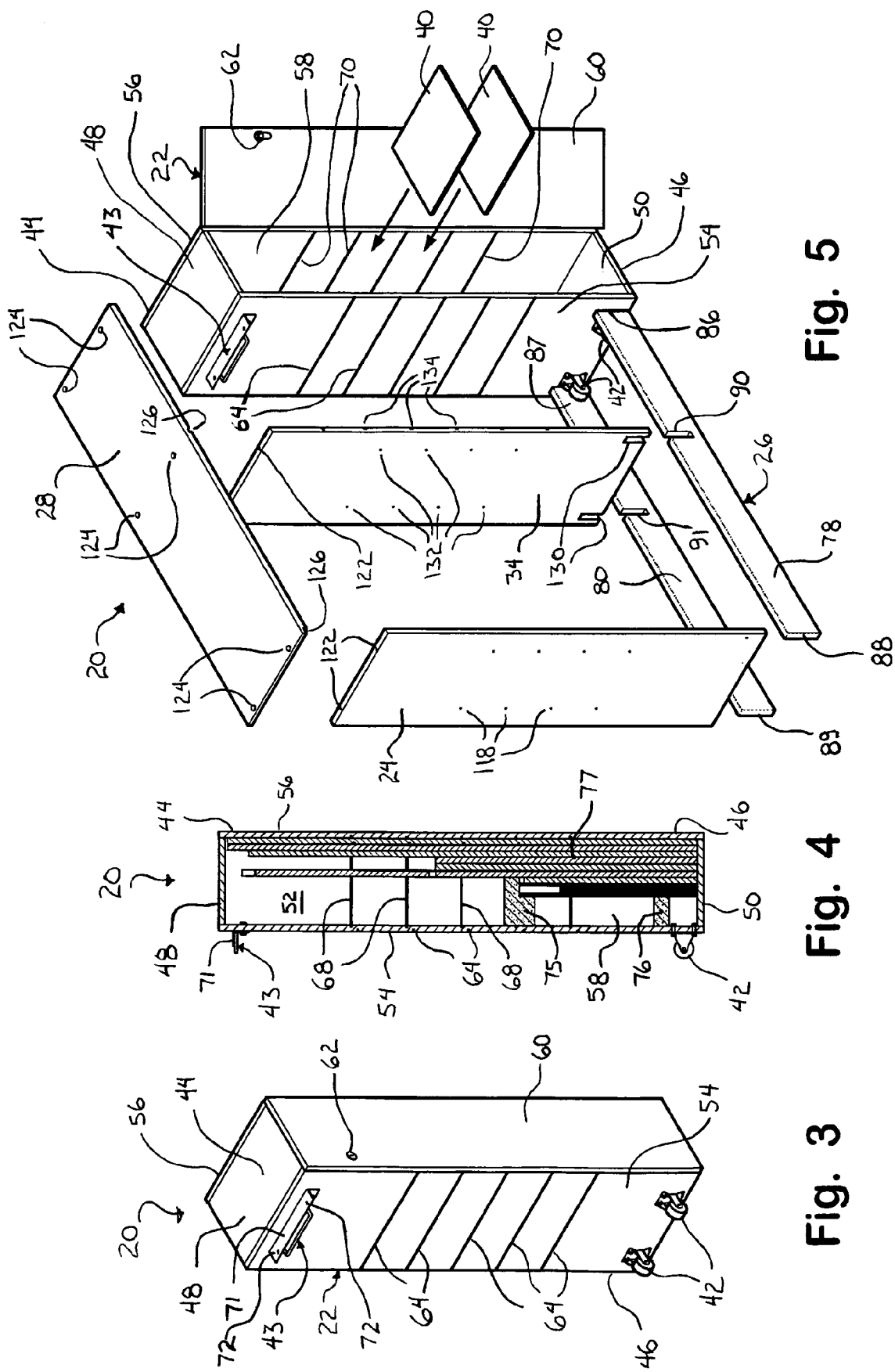

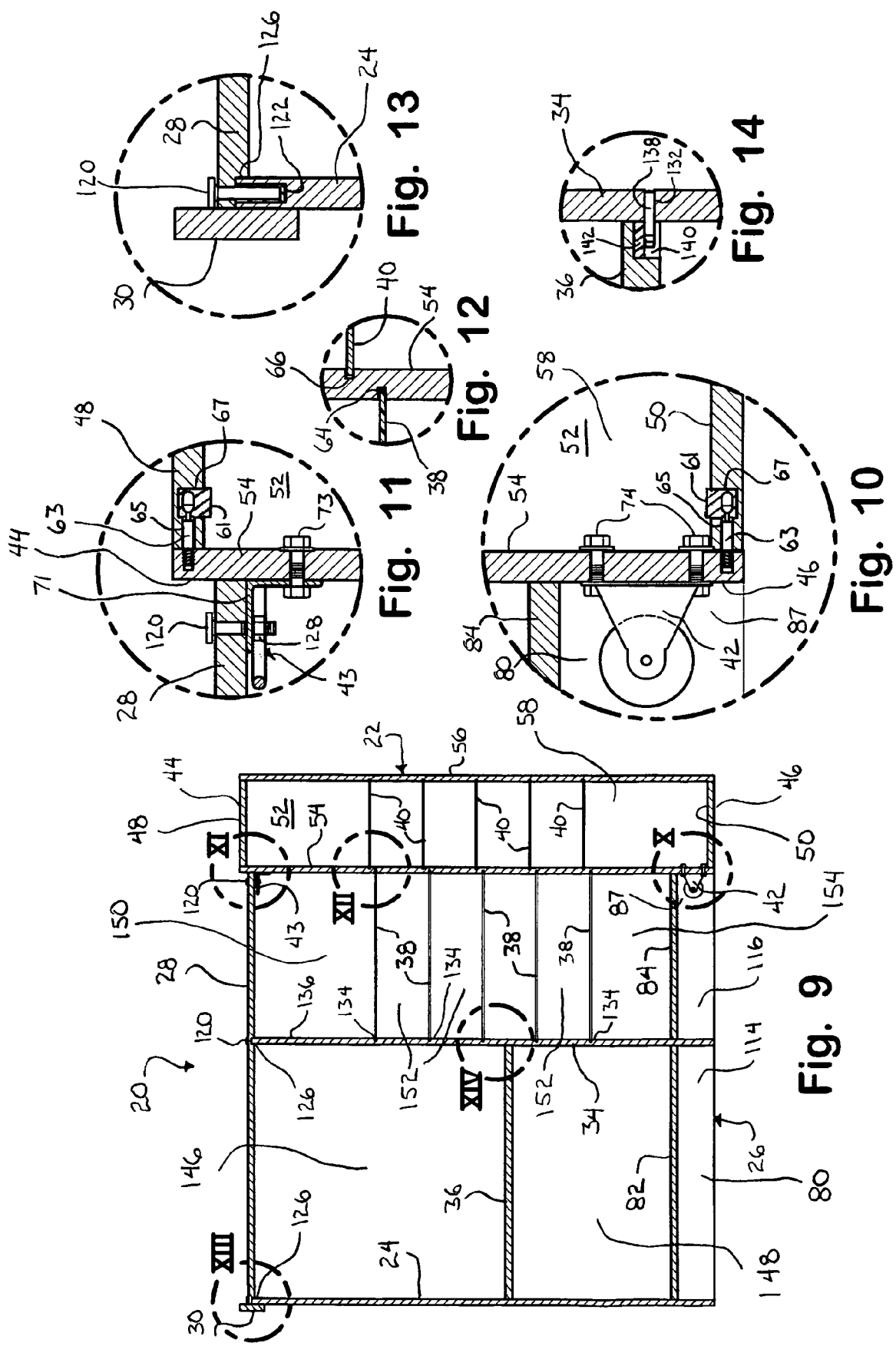

COLLAPSIBLE STORAGE DEVICE/ENTERTAINMENT CENTER

BACKGROUND AND TECHNICAL FIELD OF THE INVENTION

The present invention is directed to a collapsible storage device, and in particular to a collapsible entertainment center or shelving unit for storing or supporting numerous items that, when disassembled, is self-contained and easily transportable.

Many people live or work in locations from which they are required to frequently move, with such locations often providing only limited space. These individuals and environments include, for example, college students living in dorms, individuals living in apartments that move frequently for business or personal reasons, or business people setting up temporary offices.

Due to the limited size of such environments it is desirable to maximize the use of floor space for storage of the various items needed to live and work in such locations. Therefore, it is beneficial to have furnishings or equipment, such as entertainment centers or shelving units, to store items such as televisions, stereo equipment, compact refrigerators, CDs, DVDs, books, files, and the like. In addition to conveniently storing these items, the furnishings or equipment are beneficial to protect the items from damage or locate the items in a more suitable position for use as opposed to being merely spread or stacked upon a floor. Due to the communal living or working arrangements of some such environments, it is also desirable for the furnishings or equipment to enable stored items to be safely and securely stored to limit the risk of theft.

However, the frequent transporting of furnishings or equipment used to store such items is difficult and cumbersome. Dorms and apartments generally require the devices to be carried up and down stairs or over long distances, which often requires the assistance of numerous people and may result in injuries. Furthermore, due to the tight confines of such locations and the need to move the devices through narrow doorways, damage to both the devices and the locations often occurs.

In order to ease transportation, some furnishings and equipment devices may be disassembled. However, the original packaging is frequently not retained such that the loose pieces themselves are awkward to move or are prone to becoming lost. Furthermore, disassembly may be time consuming and require tools that individuals living in such environments do not have or do not desire to maintain. Finally, not all furnishings or equipment are even designed for disassembly.

Therefore, there is a need for a device that efficiently and securely contains and stores personal or business items, but which is easily disassembled without risk of losing disassembled pieces and is conveniently transported such that damage to the device and the environment within which it is used is avoided.

SUMMARY

A collapsible storage device according to an aspect of the present invention comprises a first member, a second member, a third member, and a stowage unit, the stowage unit having first and second ends and an internal cavity between the first and second ends. The stowage unit and the first, second, and third members are adapted to being removably connected together with the second and third members being removably connected to the first and second ends of the stowage unit and the first member being removably connected to the second and third members distal from the stowage unit whereby the collapsible storage device forms an internal storage location. In addition, the stowage unit is adapted to receive items to be stored within the internal cavity when the collapsible storage device is assembled and is adapted to contain the first, second, and third members within the internal cavity when the collapsible storage device is disassembled.

According to another aspect of the present invention, a collapsible storage device comprises a first side member, a top member, a bottom assembly, and a stowage unit, the stowage unit having first and second ends and an internal cavity between the first and second ends. The stowage unit, first side member, top member, and bottom assembly are adapted to being removably connected together with the top member and the bottom assembly being removably connected to the first and second ends of the stowage unit and the first side member being removably connected to the top member and the bottom assembly distal from the stowage unit whereby the collapsible storage device forms an internal storage location with the top member and the bottom assembly being generally horizontally oriented. In addition, the stowage unit is adapted to receive items to be stored within the internal cavity when the collapsible storage device is assembled and the stowage unit is adapted to enclose and contain the first side member, the top member, and the bottom assembly within the internal cavity when the collapsible storage device is disassembled.

According to yet another aspect of the present invention, a collapsible storage device comprises a first side member, a top member, a bottom assembly, and a stowage unit. The stowage unit has first and second ends and an internal cavity between the first and second ends and at least one handle, at least one wheel, and a door, the door being adapted to enclose the internal cavity. The stowage unit, first side member, top member, and bottom assembly are adapted to be removably connected together with the top member and the bottom assembly being removably connected to the first and second ends of the stowage unit and the first side member being removably connected to the top member and the bottom assembly distal from the stowage unit whereby the collapsible storage device forms an internal storage location with the top member and bottom assembly being generally horizontally oriented. In addition, the stowage unit is adapted to receive items to be stored within the internal cavity when the collapsible storage device is assembled and the stowage unit is adapted to receive and contain the first side member, top member, and bottom assembly within the internal cavity when the collapsible storage device is disassembled.

According to yet another aspect of the present invention, a wheel assembly adapted to be secured to a corner of a device comprises first and second flanges and a wheel, the first and second flanges defining separate planes and being adapted to mate with the corner to which the wheel assembly is to be secured.

The collapsible storage device of the present invention provides a compact and easily transportable appliance constructed to function as an entertainment center or shelving unit. The various components of the collapsible storage device may be conveniently stored within the stowage unit of the device when the device is disassembled. And when the collapsible storage device is assembled, the stowage unit provides an additional location within which items may be stored. The inclusion of wheels and a handle on the stowage unit enable simple movement when the device is disassembled and the inclusion of a locking door provides the ability to safely secure valuables within the internal cavity of the stowage unit when disassembled. Furthermore, the various connection methods that may be used to assemble the collapsible storage device, which include connectors or fasteners such as RAFIX and MOD-EEZ® connectors, pin and cam connectors, dowels, notches, pins, slots, and thumbscrews, enable the device to be easily assembled by hand without the use of complex tools. The collapsible storage device of the present invention thereby provides a storage structure for objects such as televisions, stereo equipment, compact refrigerators, CDs, DVDs, books, files, and the like, that is well-suited for environments such as dorm rooms, temporary offices, and apartments.

BRIEF DESCRIPTION OF THE DRAWINGS

FIG. 1 is a right side perspective view of a first embodiment of the collapsible storage device of the present invention constructed as an entertainment center;

FIG. 2 is a right side perspective view of the stowage unit of the collapsible storage device of FIG. 1 showing the various disassembled components of the storage device stored within the internal cavity of the stowage unit;

FIG. 3 is a left side perspective view of the stowage unit of FIG. 2 shown with the door in a closed position;

FIG. 4 is a front cross-sectional view of the stowage unit of FIG. 2;

FIG. 5 is a partial exploded left side perspective view of the collapsible storage device of FIG. 1;

FIG. 9 is a cross-sectional front elevation view along the line A-A of FIG. 1;

FIG. 10 is a detail view of area X of FIG. 9;

FIG. 11 is a detail view of area XI of FIG. 9;

FIG. 12 is a detail view of area XII of FIG. 9;

FIG. 13 is a detail view of area XIII of FIG. 9;

FIG. 14 is a detail view of area XIV of FIG. 9;

DESCRIPTION OF THE PREFERRED EMBODIMENT

Figure 7:
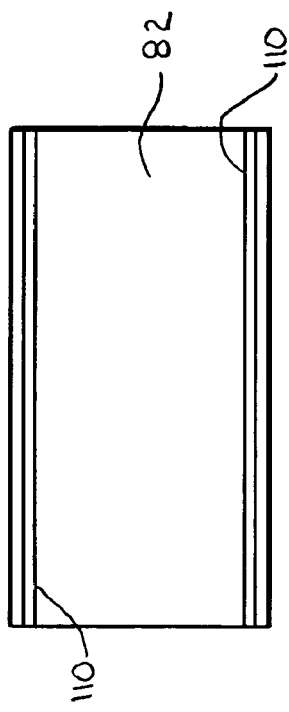
FIG. 7 is a bottom plan view of a first bottom panel.

The present invention is embodied in a collapsible storage device constructed to function as an entertainment center or shelving unit. In particular, the preferred embodiment of the present invention includes a stowage unit that forms an integral member of the invention when the device is assembled and, when disassembled, is adapted to compactly and conveniently contain all the remaining components of the device and includes wheels and a handle for ease of transportation when so disassembled.

A preferred embodiment of the present invention is shown in the drawings as collapsible storage device 20 which, when assembled, is well adapted to function as an entertainment center and/or shelving unit to support a television, stereo equipment, a compact refrigerator, CDs, DVDs, books, files, and the like. FIG. 1 shows collapsible storage device 20 in a fully assembled construction and discloses that device 20 generally includes a stowage unit 22, a first side member or first member 24, a bottom assembly or third member 26, and a top member or second member 28 to which are attached first and second trim pieces 30, 32. Collapsible storage device 20 also includes a generally vertical wall 34, a generally horizontal left shelf 36, and multiple, generally horizontal, right shelves 38 and stowage shelves 40 (see FIGS. 5 and 9). Significantly, as noted above and shown in FIGS. 2 and 4, stowage unit 22 is adapted to contain and/or store first side member 24, top member 28, trim pieces 30, 32, bottom assembly 26, and shelves 36, 38, 40 when collapsible storage device 20 is disassembled. Stowage unit 22 also includes wheels 42 and handle 43 that enable collapsible storage device 20 to be easily transported when disassembled.

Stowage unit 22, in the preferred embodiment shown in FIGS. 1-6, is constructed to have a substantially rectangular box or chest like form with first and second ends 44, 46. Stowage unit 22 is constructed from a top piece 48, a bottom piece 50, a back piece 52, and left and right side pieces 54, 56 that, when assembled together, form an internal cavity 58. Stowage unit 22 also includes a sealing member or door 60 having a lock 62, preferably operated by a key, with door 60 being connected to right side piece 56 by standard hinges (not shown) such that internal cavity 58 can be selectively sealed and secured.

FIGS. 9-11 disclose that top and bottom pieces 48, 50 are secured to left side piece 54 using pin 63 and cam 61 connectors. To assemble top and bottom pieces 48, 50 to left side piece 54, four pins 63 are initially threaded into left side piece 54, with the pins 63 being positioned near the four corners of left side piece 54. FIGS. 10 and 11 show two pins 63 at the first and second end 44, 46 front corners of left side piece 54. Although not shown, two pins 63 are similarly installed at the first and second end 44, 46 back corners. Top and bottom pieces 48 and 50 each include two edge holes 65 that enable top and bottom pieces 48, 50 to be installed over pins 63. Top and bottom pieces 48, 50 also each include two cam holes 67 that are connected and generally perpendicularly oriented to edge holes 65. Prior to installing top and bottom pieces 48, 50 over pins 63, a cam 61 is placed in both cam holes 67 of both top and bottom pieces 48, 50. Cam 61 includes an internal cavity (not shown) adapted to receive the head of pin 63 and a slotted or Philips style receptacle (not shown), or the like, such that cam 61 may be rotated within cam hole 67. After installing top and bottom pieces 48, 50 to left side piece 54, cams 61 are rotated such that cam 61 securely engages the head of pin 63, thereby securing top and bottom pieces 48, 50 to left side piece 54.

Although not shown, in the preferred embodiment pin 63 and cam 61 may also be used to secure back and right side pieces 52, 56 to top and bottom pieces 48, 50. It should be appreciated, however, that alternative types of fasteners or securing methods may also be used to assemble stowage unit 22, such as dowels, glue, brackets, standard nuts and bolts, or the like. Furthermore, more than one of these connection methods may be used in conjunction with another to provide added assembly strength.

As shown in FIGS. 2 and 3, left side piece 54 includes both a plurality of external slots 64 and internal slots 66. FIG. 4 discloses that back piece 52 includes back slots 68 accessible from internal cavity 58 and FIG. 5 discloses that right side piece 56 includes right slots 70 that are also accessible from internal cavity 58. External slots 64, internal slots 66, back slots 68, and right slots 70 are formed as narrow channels on left side piece 54, back piece 52, and right side piece 56, respectively. As understood from FIG. 9, internal slots 66, back slots 68, and right slots 70 are located on substantially the same plane when left side piece 54, back piece 52, and right side piece 56 are assembled together to form stowage unit 22. Therefore, as shown in FIG. 5, removable stowage shelves 40 may be slid into and out of stowage unit 22. Stowage shelves 40 are intended to be installed within slots 66, 68, 70 of stowage unit when collapsible storage device 20 is assembled and are removed and contained in the manner described below within internal cavity 58 when disassembled.

In the preferred embodiment, stowage unit 22 is approximately 4' high, approximately 0.5-0.8' wide, and approximately 1.2' deep, with the pieces 48, 50, 52, 54, 56 and door 60 being constructed of a ⅝" thick medium density fiber (MDF) board core covered with a laminate, where the laminate surface may be constructed of various colors based on appearance considerations. It should be appreciated, however, that the core of pieces 48, 50, 52, 54, 56 and door 60 could alternatively be constructed of different thicknesses or of solid natural wood, plastic, a metallic material, other type of particle board, or the like, and still function as intended. It should also be understood that the laminate surface may be constructed of various materials, such as a wood, polymeric, or metallic material. The laminate surface may even not be included on one or more of pieces 48, 50, 52, 54, 56 or door 60, and, for example, the core material may be painted directly. Also in the preferred embodiment shown, stowage shelves 40 are constructed of transparent plastic, such as from PLEXIGLAS sheets, but may alternatively be constructed of wood based material, a metallic material, or a different type of polymeric material.

As previously noted and shown in FIGS. 3-5, stowage unit 22 includes wheels 42 and handle 43, where wheels 42 are standard caster style wheels and handle 43 includes mounting plate 71 having mounting holes 72. FIG. 11 discloses that handle 43 is secured to left side piece 54 proximate first end 44 using threaded fastener 73 and FIG. 10 discloses that wheels 42 are secured to left side piece 54 proximate second end 46, using threaded fasteners 74. Handle 43 and wheels 42 enable easy transportation of stowage unit 22 by allowing a user, as best understood with reference to FIG. 4, to tilt stowage unit 22 counterclockwise, thereby allowing wheels 42 to rollingly support stowage unit 22 such that handle 43 may be used to push or pull the disassembled collapsible storage device 20.

As previously noted and shown in FIGS. 2 and 4, stowage unit 22 is adapted to contain first side member 24, top member 28, trim pieces 30, 32, bottom assembly 26, wall 34, and shelves 36, 38, 40 within internal cavity 58 when collapsible storage device 20 is disassembled, with the components being collectively identified as 77 in FIGS. 2 and 4. The various components being stacked upon each other in a flat orientation with foam blocks 75, 76 being used to secure the various components from movement during transportation to prevent damage. Although shown as foam blocks, alternative structures may be used to secure disassembled components 77. For example, a packing strip constructed of plastic or wood and designed with a profile to mate with the stacked disassembled components 77 may be employed. Further still, such a packing strip may be designed to be inserted into one or more slots 66, 68, 70 to provide additional movement prevention.

Although FIGS. 1, 2, 5 and 6 disclose the use of a hinged door 62 to selectively enclose or allow access to internal cavity 58, it should be understood that alternative structures could be used to selectively enclose internal cavity 58. For example, a completely removable sealing member constructed as a panel or board could be affixed to left and right side pieces 54, 56 and top and bottom pieces 48, 50 using threaded fasteners, or the like. In this embodiment, the sealing member could also form a component of the assembled collapsible storage device 20, such as a side member, top member, bottom assembly, vertical wall, or horizontal shelf, whereby the internal cavity 58 would remain accessible when device 20 was assembled.

Bottom assembly 26, as understood with reference to FIGS. 1 and 5-8, includes first and second braces 78, 80 and first and second bottom panels 82, 84. In the preferred embodiment, first and second braces 78, 80 are constructed to be substantially identical and, when assembled, are substantially parallel to one another. One end 86, 87 of first and second braces 78, 80 are adapted to connect to second end 46 of stowage unit 22 and, specifically, to left side piece 54, and the other end 88, 89 connect to first side member 24. First and second braces 78, 80 each include a notch 90, 91 for receiving wall 34 when collapsible storage device 20 is assembled, as described in more detail below. In the preferred embodiment, first and second braces 78, 80 are constructed of ⅝" thick MDF and are painted with a paint color chosen based on appearance considerations. Alternatively, first and second braces 78, 80 may be of varying thicknesses or laminated or may be constructed of, or have a core material of, solid wood, plastic, a metallic material, or other type of particle board and still function as intended.

Figure 15:
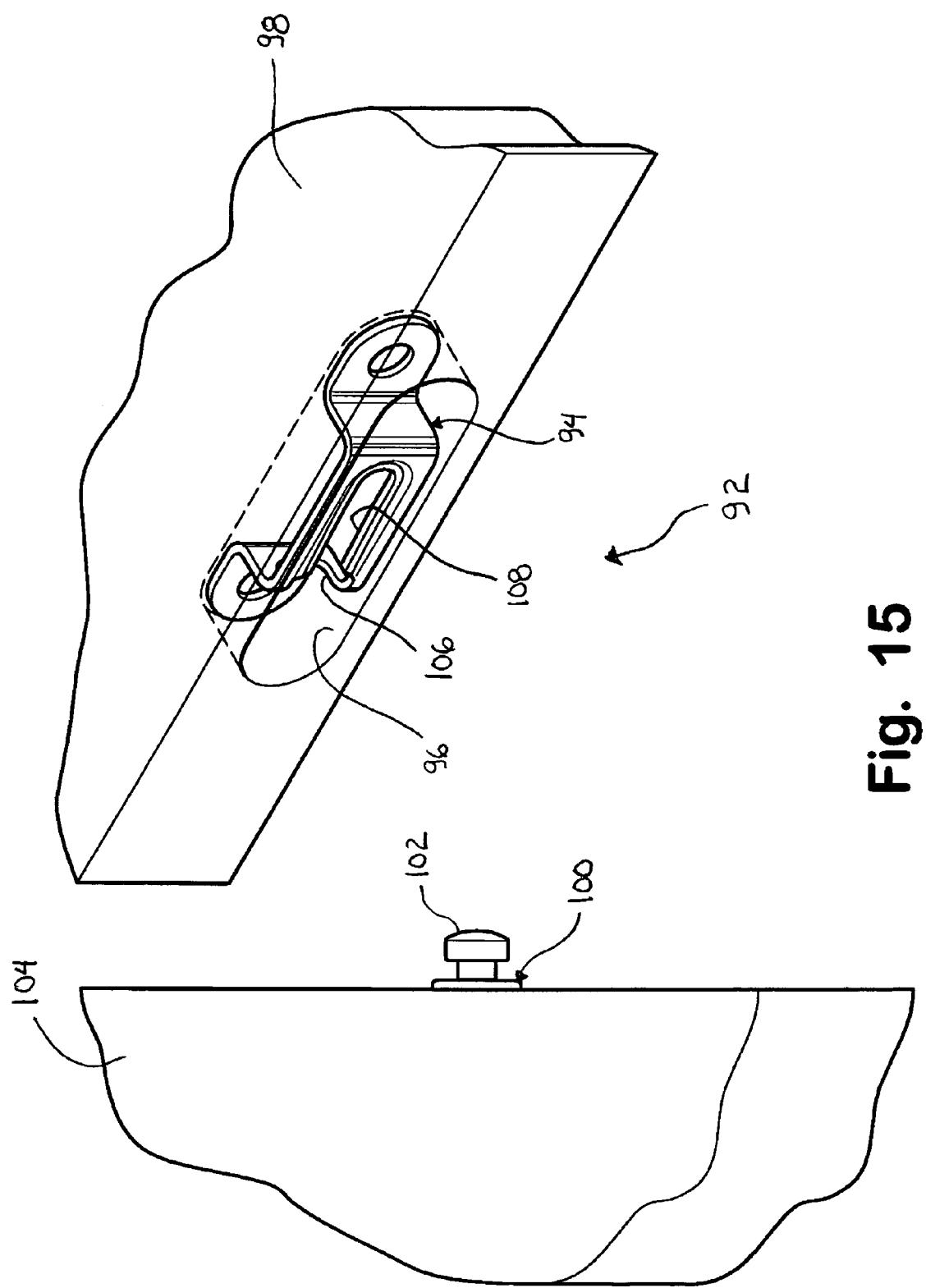
FIG. 15 is a perspective view of a MOD-EEZ® connector that is used in the assembly of the present invention.

In the preferred embodiment, first and second braces 78, 80 are connected to stowage unit 22 and to first side member 24 using MOD-EEZ® style fasteners 92 supplied by Modular Systems, Inc. of Fruitport, Mich. FIG. 15 discloses an example of such a connector 92, wherein a fastener clip 94 is secured within a cavity 96 formed on a first part 98 that is to be joined and a securing stud 100 having a connecting head 102 is threaded into a second part 104 that is to be joined to the first part 98. Head 102 is caused to enter opening 106 of slot 108 such that the combination of second part 104 and securing stud 100 may be engagingly slid relative to slot 108, thereby securely joining first and second parts 98, 104 in flush engagement. Alternatively, fastener clip 94 may be secured within a notch, as opposed to a cavity 96, with such an arrangement being particularly applicable when securing fastener clip 94 to an end of first and second braces 78, 80 where the width of fastener clip 94 is approximately the same as the thickness of first and second braces 78, 80. It should also be understood, however, that alternative styles or methods of connection may be used to secure first and second braces 78, 80 to stowage unit 22 and first side member 24, such as brackets, pin 63 and cam 61 connectors, dowels, standard nuts and bolts, or the like.

Figure 8:
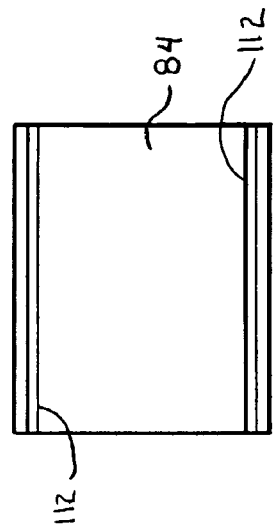
FIG. 8 is a bottom view of a second bottom panel.

First and second bottom panels 82, 84 are adapted to be placed on top of first and second braces 78, 80 on either side of wall 34. As shown in FIGS. 7 and 8, first bottom panel 82 includes grooves 110 and second bottom panel 84 includes grooves 112. Grooves 110 on first bottom panel 82 and grooves 112 on second bottom panel 84 are spaced apart from one another to match the distance first and second braces 78, 80 are spaced apart from each other when assembled, such that grooves 110, 112 receive the top edges of braces 78, 80. First and second bottom panels 78, 80, therefore, resist lateral movement relative to first and second braces 78, 80 due to grooves 110, 112 and are prevented from longitudinal movement relative to first and second braces 78, 80 due to placement between first side member 24 and wall 34, and between stowage unit 22 and wall 34.

Figure 6:
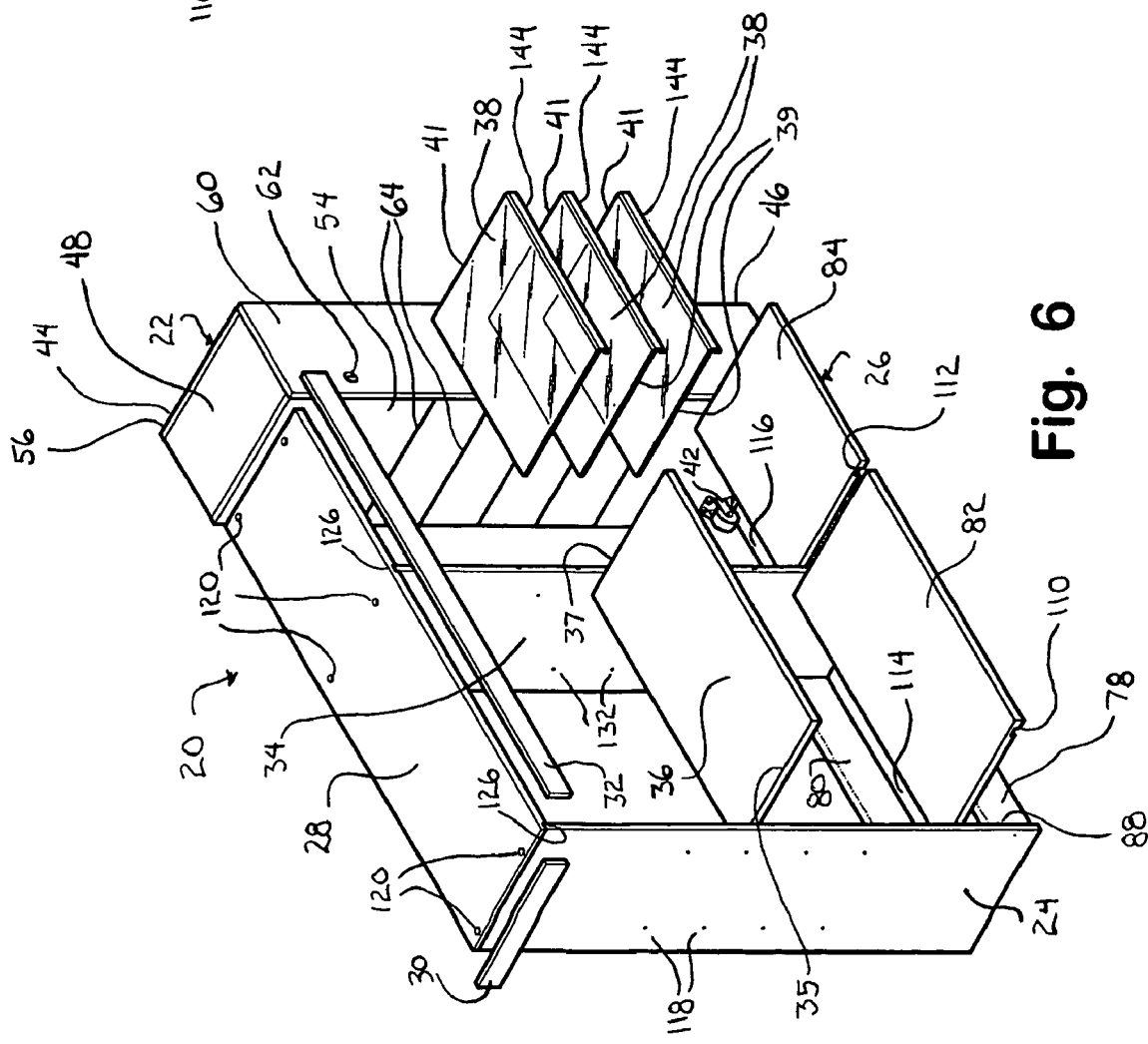
FIG. 6 is an exploded left side perspective view of the collapsible storage device of FIG. 1 at a later stage of assembly compared to FIG. 5.

As understood from FIGS. 6 and 9, first and second covered spaces 114, 116 are formed underneath first and second bottom panels 82, 84. First and second covered spaces 114, 116 may be used to store foam blocks 75, 76 and the assembly instructions for collapsible storage device 20 when device 20 is assembled. As will be understood from FIG. 6, covered space 116 also contains wheels 42 such that the wheels are concealed and hidden from view when bottom panel 84 is assembled in place. In the preferred embodiment, first and second bottom panels 82, 84 are constructed of ⅝" thick melamine board. Alternatively, first and second braces may be constructed of solid natural wood, particle board, a metallic material, another type of polymeric material, or the like.

First side member 24 is connected to first and second braces 78, 80 of bottom assembly 26 and to top member 28. In the preferred embodiment, first side member 24 includes a plurality of shelf holes 118 that, when collapsible storage device 20 is assembled, form a series of pairs of horizontally aligned holes 118 spaced at vertical intervals. Shelf holes 118, as described below, are used to mount left shelf 36. As shown in FIGS. 1, 9, and 13, in the preferred embodiment, top member 28 and first side member 24 are secured together using threaded fasteners 120, where fasteners 120 are thumb-screw type fasteners that are adapted to be tightened and loosened by hand and first side member 24 includes threaded receiver 122 adapted to receive fastener 120. First side member 24 is also preferably constructed of ⅝" thick MDF board, but could alternatively be constructed of different thicknesses or of solid natural wood, plastic, a metallic material, other type of particle or fiber board, or the like, and still function as intended. First side member 24 could also be laminated or painted.

Top member 28, in addition to being connected to first side member 24, is also connected to wall 34 and handle 43 of stowage unit 22 proximate first end 44. As shown in FIG. 5, top member 28 includes through holes 124 for fasteners 120. Top member 28 also includes a pair of grooves 126, as shown in FIGS. 5, 6, 9, and 13, that extend the width of top member 28 and are aligned with the through holes 124 used to affix top member 28 with first side member 24 and wall 34. Grooves 126 are adapted to engage first side member 24 and wall 34 when top member 28 is assembled to collapsible storage device 20. Alternatively, top member 28 may be constructed without grooves 126 and could still function as intended. In the preferred embodiment, top member 28 is constructed of melamine board, but may alternatively be constructed of solid natural wood, particle board, a metallic material, another type of polymeric material, or the like. Top member 28 may also be alternatively constructed of a core material having a laminated surface.

Top member 28 is secured to wall 34 using fasteners 120 in the same manner in which top member 28 is secured to first side member 24, as described above and shown in FIG. 13. As understood from FIGS. 9 and 11, top member 28 is also secured to handle 43 through mounting holes 72 (FIG. 3) using fasteners 120 and a standard nut 128. Although shown as utilizing thumb-screw style fasteners 120, it should be understood that standard bolts, dowels, pin 63 and cam 61 connectors, MOD-EEZ® fasteners 92, or the like could alternatively be used to secure top member 28 to first side member 24, wall 34, and handle 43.

As shown in FIGS. 1, 6, and 9, first and second trim pieces 30, 32 are secured to top member 28 in the preferred embodiment. Trim pieces 30, 32 are connected to top member 28 using MOD-EEZ® fasteners 92 as described above with first and second braces 78, 80 and shown in FIG. 15. Alternatively, trim pieces 30, 32 may be connected to collapsible storage device 20 using Velcro, threaded fasteners, or the like. In the preferred embodiment, trim pieces 30, 32 are constructed of ⅝" thick MDF board and painted, but may be constructed of alternative materials and thicknesses in like manner as the components described above. It should also be appreciated that collapsible storage device 20 may be constructed without the inclusion of trim pieces 30, 32. In such an alternative, foam blocks 75, 76 may be altered such that the remaining disassembled components 77 are securely held in place when contained within internal cavity 58.

Wall 34, similar to first side member 24, is connected to first and second braces 78, 80 of bottom assembly 26 and to top member 28. In the preferred embodiment, wall 34 includes notches 130 (FIG. 5) that are spaced apart and adapted to mate with notches 90, 91 of first and second braces 78, 80 in an overlapping connection arrangement. Wall 34 includes a series of pairs of shelf holes 132 that are constructed to horizontally align with shelf holes 118 on first side member 24 when collapsible storage device 20 is assembled. Wall 34 also includes slots 134 on side 136 (FIGS. 1 and 9) that align with external slots 64 on stowage unit 22 when device 20 is assembled. Wall 34 also includes threaded receivers 122, as described and shown in FIG. 13 in relation to first side member 24, where threaded receivers 122 receive fasteners 120 when assembling top member 28. In the preferred embodiment, wall 34 is constructed of ⅝" thick MDF board and is covered with a laminate, but may be constructed of alternative materials and thicknesses in like manner as the components described above.

As previously noted, collapsible storage device 20 includes a generally horizontal left shelf 36 and multiple generally horizontal right shelves 38. FIG. 6 discloses that left shelf 36 includes first and second shelf ends 35, 37 and, as shown in FIGS. 1, 6, and 9, left shelf 36 is installed between first side member 24 and wall 34 using shelf holes 118, 132 on first side member 24 and wall 34, with first shelf end 35 being removably connected to first side member 24 and second shelf end 37 being removably connected to wall 34. Left shelf 36, therefore, may be horizontally positioned at a selected vertical height depending upon which set of shelf holes 118, 132 on first side member 24 and wall 34 are selected.

FIG. 14 discloses the use of a pin 138 and a grommet 142 in the preferred embodiment to mount left shelf 36, with pin 138 and grommet 142 comprising a connector, such as a RAFIX-style connector supplied by the Hafele America Corp. of Archdale, N.C. Left shelf 36 includes cavity 140 and a plastic grommet 142 installed in cavity 140, where plastic grommet 142 is substantially U-shaped. Pin 138 is installed within shelf hole 132 and, when left shelf 36 is installed, engages plastic grommet 142 to form a secure snap-fit type connection. Although FIG. 14 only discloses one pin 138, one grommet 142, and one cavity 140, it should be understood that left shelf 36 is designed to include four spaced cavities 140, each of which includes a grommet 142. Thus, two pins 138 are installed within shelf holes 132 of wall 34 and two pins 138 are installed within shelf holes 118 on first side member 24 for engagement with the four grommets 142 of left shelf 36 to thereby provide secure and level support for left shelf 36. Left shelf 36 is preferably constructed of melamine board, but may alternatively be constructed of solid wood, particle board, metallic material, or another polymeric material.

FIGS. 1, 6, 9, and 12 disclose that right shelves 38 are adapted to be slidably inserted into external slots 64 of stowage unit 22 which are horizontally aligned with slots 134 of wall 34 such that right shelves 38 are supported substantially horizontally within collapsible storage device 20 when assembled. FIG. 6 discloses that each right shelf 38 includes first and second shelf ends 39, 41, with first shelf end 39 being removably connectable to wall 34 and second shelf end 41 being removably connectable to stowage unit 22. FIG. 6 also discloses that each right shelf 38 includes a front lip 144 that, as understood from FIG. 1, controls the depth position to which the shelves 40 are slid into collapsible storage device 20 when installed due to lip 144 contacting the edges of wall 34 and left side piece 54. Right shelves 38 are preferably constructed of transparent plastic, such as, PLEXIGLAS sheets, but may alternatively be constructed of solid wood, particle board, metallic material, or another polymeric material.

Although FIG. 1 discloses a single left shelf 36 and multiple right shelves 38, it should be understood that collapsible storage device 20 may alternatively utilize multiple left shelves 36 and/or a single right shelf 38. Similarly, although left shelf 36 is disclosed as being supported by pins 138 and right shelves 38 within slots 64, 134, left shelf 36 could alternatively be constructed for support within slots and/or right shelves 38 could be constructed to be supported with pins. Furthermore, left shelf 36 and right shelves 38 may also be alternatively secured to collapsible storage device 20 using brackets, threaded fasteners, or the like.

Assembly of collapsible storage device 20 is generally as follows: Initially, as shown in FIG. 5, first and second braces 78, 80 are connected to the lower portion of second end 46 of stowage unit 22. Wall 34 and first side member 24 are then connected to first and second braces 78, 80. Next, top member 28 is secured to first side member 24, wall 34, and handle 43 of stowage unit 22. Stowage shelves 40 may then be installed into stowage unit 22, as also shown in FIG. 5. As shown in FIG. 6, left shelf 36, right shelves 38, first and second bottom panels 82, 84, and trim pieces 30, 32 may then also be assembled to collapsible storage device 20, all in the manner described above. When so assembled, collapsible storage device 20 includes multiple internal storage locations 146, 148, 150, 152, 154 located within the spaced defined by first side member 24, top member 28, bottom assembly 26, and stowage unit 22. As shown in FIGS. 1 and 9, internal storage locations 146, 148 are located above and below left shelf 36, respectively. Internal storage location 150 is located between top member 28 and the upper most right shelf 38. Internal storage location 154 is located between bottom assembly 26 and the lower most right shelf 38 and internal storage locations 152 are located between the right shelves 38.

Figure 16:
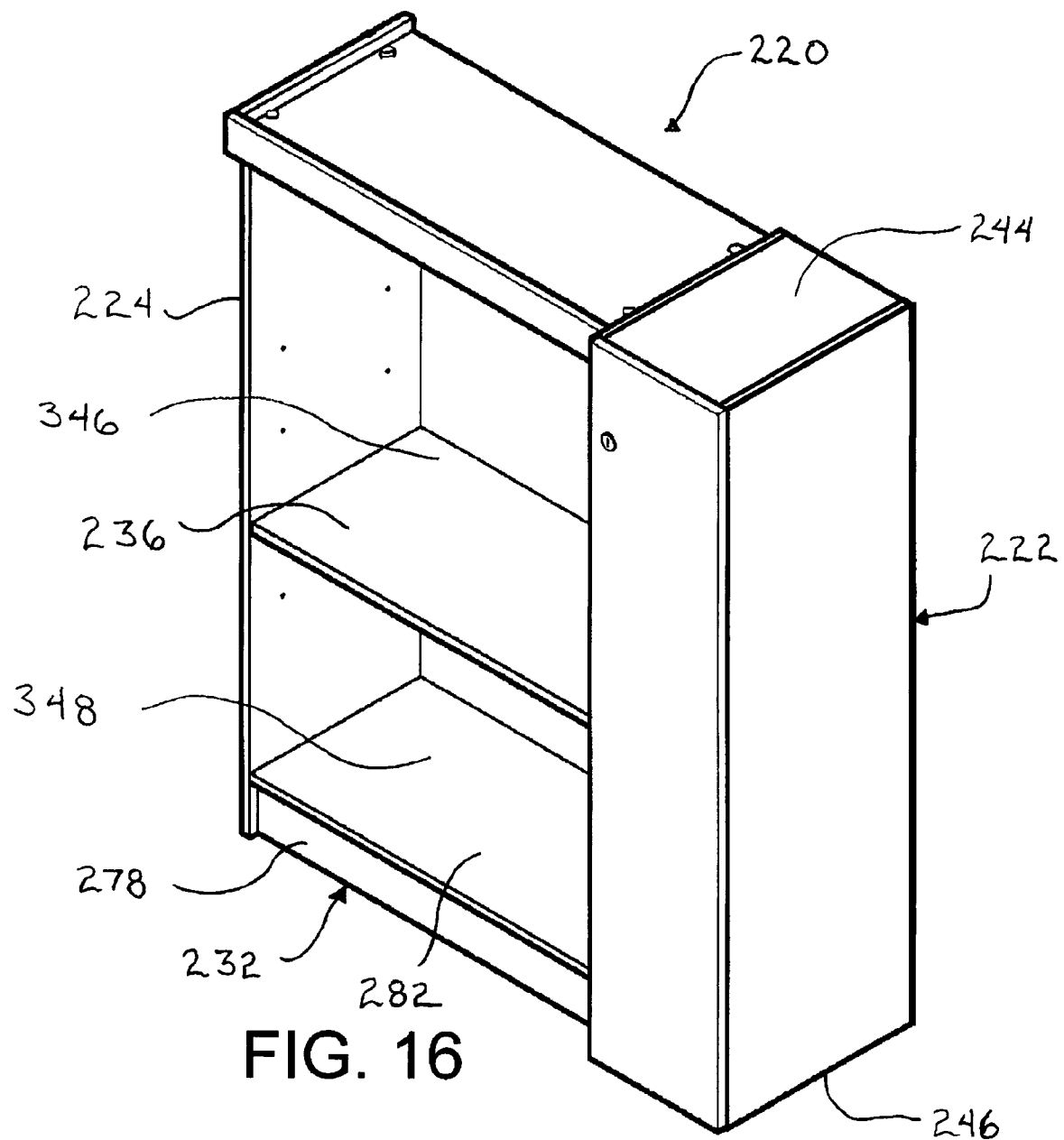
FIG. 16 is a right side perspective view of an alternative embodiment of the collapsible storage device of the present invention.

FIG. 16 discloses an alternatively embodied collapsible storage device identified by numeral 220. Collapsible storage device 220 is similar to device 20 described above and includes a stowage unit 222 having first and second ends 244, 246. Collapsible storage device 220 does not include a generally vertical central wall 34. Hence, bottom assembly 232 is constructed of a first brace 278 and a second parallel brace (not shown) that do not include notches with only a single bottom panel 282 fitted thereon with grooves such as those shown at 110 or 112. In addition, shelf 236 is constructed to connect to first side member 224 and left side piece (not shown) of stowage unit 227, where shelf 236 may be secured to member 224 and the left side piece by pins, slots, brackets, or the like. As shown, collapsible storage device 220 includes internal storage locations 346 and 348.

In regard to other alternatives, although door 60 of stowage unit 22 is disclosed as opening from the front of collapsible storage device 20, as viewed in FIG. 1, it should be understood that stowage unit 22 could alternatively be constructed such that door 60 opens to the right side of device 20. In such an embodiment, wheels 42 and handle 43 could be mounted to back piece 52 with bottom assembly 26, right shelves 38, and top member 28 being securable to back piece 52. Similarly, although door 60 is shown as opening from left to right with the hinges being mounted on right side piece 56, stowage unit 22 could be alternatively constructed with the hinges mounted on left side piece 54 such that door 60 opens from right to left.

Similarly, although stowage unit 22 is disclosed as being located on the right side of collapsible storage device 20 when assembled, as viewed in FIG. 1, it should also be appreciated that an alternative stowage unit may be located on the left side of collapsible storage device 20 and still function as intended. Further still, a stowage unit may alternatively be constructed to form a top member or a bottom member, with the internal cavity of the stowage unit forming an upper or lower horizontal cabinet. In such an embodiment, for example, wheels 42 could be placed on back piece 52 to be hidden from view when assembled. Still further, a stowage unit could be used to form a central wall with generally horizontal shelves extending toward first and second side members located on either side of the stowage unit. In such alternative embodiments, the stowage unit would still be utilized to form an integral member of the collapsible storage device when assembled and be able to contain the various components of the collapsible storage device when disassembled.

In yet another alternative embodiment, bottom assembly 26 could be constructed to comprise a single board or panel that is attached to stowage unit 22, wall 34, and first side member 24, as opposed to comprising first and second braces 78, 80 and first and second bottom panels 82, 84.

Figure 18:
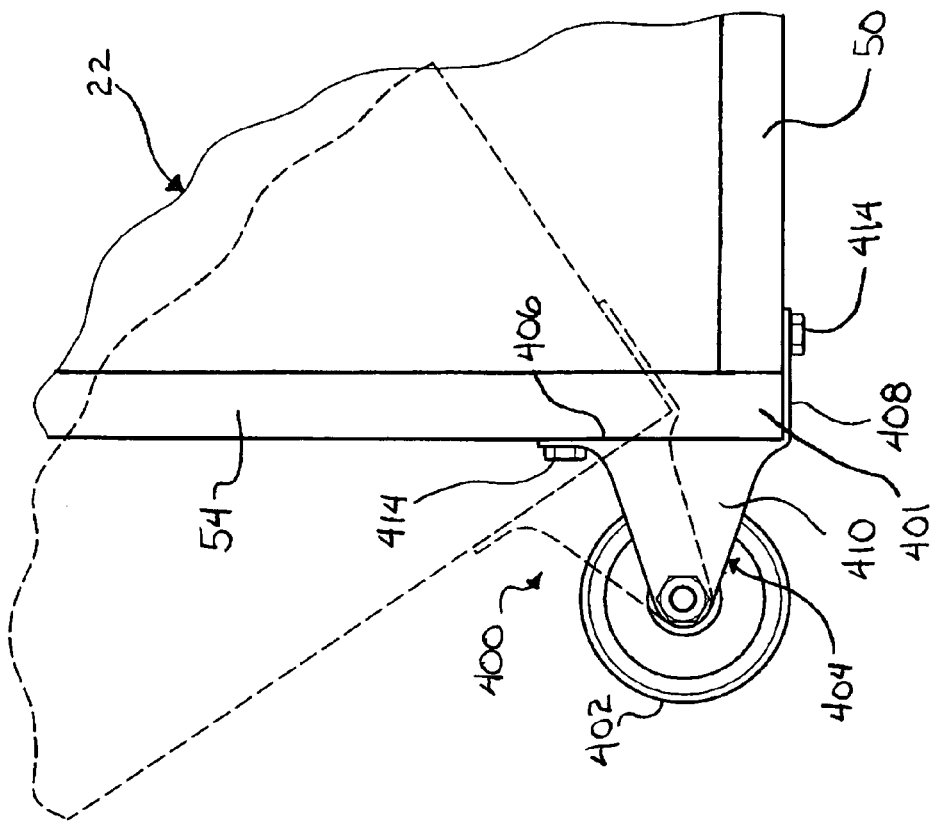
FIG. 18 is a side view of the wheel of FIG. 17 shown affixed to a stowage unit.
Figure 17:
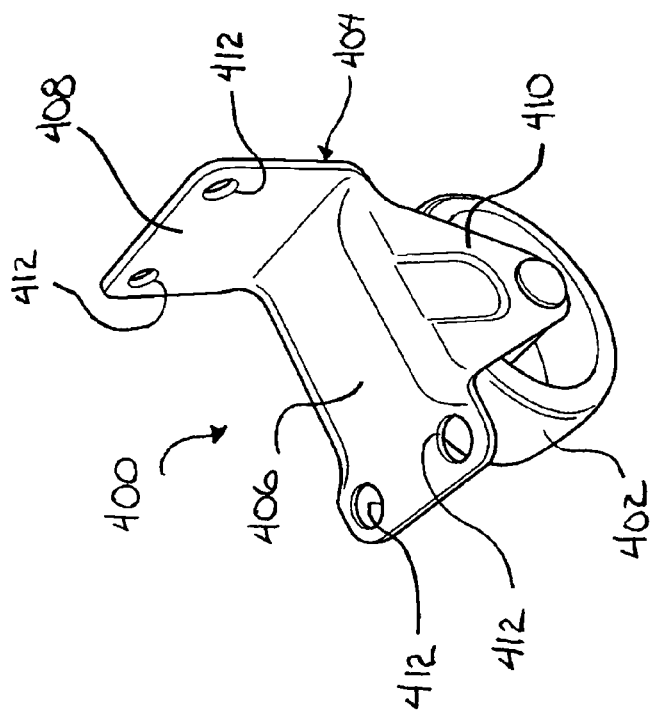
FIG. 17 is a perspective view of an alternative wheel that may be affixed to the stowage unit of the present invention.

FIG. 17 discloses an alternative wheel or wheel assembly 400 that, as shown in FIG. 18, may be mounted to corner 401 of stowage unit 22 of collapsible storage device 20 in place of wheels 42 shown in FIGS. 3, 4, and 10. Wheel assembly 400 includes a wheel 402 and a generally L-shaped bracket 404 having first and second flanges 406, 408. In the preferred embodiment shown, first and second flanges 406, 408 are oriented generally perpendicular to each other to form an approximate right angle. As shown, wheel 402 is attached to first flange 406 by legs 410 such that a plane defined by second flange 408 forms an approximate tangent to wheel 402. Both first flange 406 and second flange 408 of bracket 404 include mounting holes 412 such that wheel assemblies 400 may be mounted to stowage unit 20 using fasteners 414, with first flange 406 being mounted to left side piece 54 and second flange 408 being mounted to bottom piece 50. When so assembled, a plane extending from bottom piece 50 forms an approximate tangent relative to wheel 402.

Several advantages are obtained by installation of wheel assemblies 400 to stowage unit 22. For example, wheel assemblies 400 can be used to securely affix left side piece 54 to bottom piece 50, thus eliminating the need for separate fasteners 74 or pin 63 and cam 61 connectors, as shown in FIG. 10, or if used with fasteners 74 and pin 63 and cam 61 connectors, wheel assemblies 400 may provide additional structural integrity. In addition, the generally L-shaped configuration of bracket 404 functions to protect the corner of stowage unit 22, thus preventing damage. Furthermore, because wheel 402 is tangent to a plane defined by bottom piece 50, wheel assemblies 400 function as a leg or support when stowage unit 22 is in an upright position and assist in preventing tipping. Another benefit provided by the positioning of wheel 402 close to the surface upon which bottom piece 54 will rest is that stowage unit 22 may be more easily tipped into position for rolling movement when collapsible storage device 20 is disassembled. Specifically, stowage unit 22 need only be rotated at a slight angle relative to the vertical upright standing position in order to be rollingly moved, as shown in phantom in FIG. 18, thus enabling easier movement of device 20.

It should be understood that first and second flanges 406, 408 may be oriented at angles greater or less than 90 degrees to mate with and attach to alternative stowage units or structures having corners that do not form right angles. It should also be understood that bracket 404 may be secured to stowage units or structures by alternative methods. For example, bracket 404 may be secured to stowage unit 22 using an adhesive. Alternatively, if stowage unit 22 were constructed of a metallic material, bracket 404 could be secured thereto by welding.

Collapsible storage device 20 provides a unique and easily transportable, compact appliance constructed to function as an entertainment center or shelving unit. The various components of the collapsible storage device 20 may be conveniently stored within stowage unit 22 when device 20 is disassembled, and the inclusion of wheels 42 and a handle 43 on stowage unit 22 enable simple movement when so disassembled. Furthermore, the various connection methods, such as RAFIX connectors 63 and MOD-EEZ® fasteners 92, notches 90, 91, 130, pins 138, slots 64, 66, 68, 70, 134, and thumb-screws 120, enable collapsible storage device 20 to be easily assembled by hand without the use of complex tools. The collapsible storage device 20 thereby provides a storage structure for objects such as a television, stereo equipment, a compact refrigerator, CDs, DVDs, and books, or the like, and is well-suited for dorm rooms, temporary offices, and apartments.

The above is a description of the preferred embodiments. One skilled in the art will recognize that changes and modifications may be made without departing from the spirit of the disclosed invention, the scope of which is to be determined by the claims which follow and the breadth of interpretation that the law allows.

The invention claimed is:

1. A collapsible storage device comprising:
   a first member;
   a second member;
   a third member; and
   a stowage unit, said stowage unit having first and second ends and an internal cavity between said first and second ends;
   said stowage unit and said first, second, and third members adapted to being removably connected together with said second and third members being removably connected to said first and second ends of said stowage unit and said first member being removably connected to said second and third members distal from said stowage unit whereby said collapsible storage device forms an internal storage location, said stowage unit being adapted to receive items to be stored within said internal cavity when said collapsible storage device is assembled and said stowage unit being adapted to contain said first, second, and third members within said internal cavity when said collapsible storage device is disassembled, further including at least one generally vertical wall, wherein said wall is adapted to being removably connected to said collapsible storage device within said internal storage location when said storage device is assembled, and wherein said stowage unit is adapted to contain said wall within said internal cavity when said collapsible storage device is disassembled, and further including at least one generally horizontal shelf having first and second shelf ends, wherein one of said first and second shelf ends is adapted to be removably connected to said wall within said internal storage location when said storage device is assembled, and wherein said stowage unit is adapted to contain said shelf within said internal cavity when said collapsible storage device is disassembled.

2. The collapsible storage device of claim 1, wherein said stowage unit includes a sealing member, said sealing member being adapted to enclose said internal cavity.

3. The collapsible storage device of claim 2, wherein said sealing member is a door, said door being adapted to completely enclose said internal cavity.

4. The collapsible storage device of claim 1, wherein said stowage unit includes at least one wheel, said at least one wheel being located proximate one of said ends and adapted to enable rolling movement of said collapsible storage device when disassembled.

5. The collapsible storage device of claim 4, wherein said wheel includes a bracket having first and second flanges and said ends of said stowage unit include a corner, said first and second flanges being adapted to mate with said corner when said wheel is mounted to said stowage unit.

6. The collapsible storage device of claim 4, wherein said at least one wheel is concealed by said third member when said collapsible storage device is assembled.

7. The collapsible storage device of claim 1, wherein said stowage unit includes at least one handle, said handle being adapted to aid in the transportation of said collapsible storage device when disassembled.

8. The collapsible storage device of claim 7, wherein said handle is located proximate one of said ends, and wherein one of said second and third members is removably mountable to said handle when said collapsible storage device is assembled.

9. The collapsible storage device of claim 1, further including at least one generally horizontal shelf, wherein said shelf is adapted to being removably connected to said collapsible storage device within said internal storage location when said storage device is assembled, and wherein said stowage unit is adapted to contain said shelf within said internal cavity when said collapsible storage device is disassembled.

10. The collapsible storage device of claim 1, further including at least one removable stowage shelf, wherein said stowage shelf is adapted to being mounted within said internal cavity of said stowage unit when said collapsible storage device is assembled such that said stowage shelf can support items to be stored within said internal cavity, and wherein said stowage unit is adapted to contain said stowage shelf within said internal cavity when said collapsible storage device is disassembled.

11. A collapsible storage device comprising:
   a first side member;
   a top member;
   a bottom assembly; and
   a stowage unit, said stowage unit having first and second ends and an internal cavity between said first and second ends;
   said stowage unit, said first side member, said top member, and said bottom assembly adapted to being removably connected together with said top member and said bottom assembly being removably connected to said first and second ends of said stowage unit and said first side member being removably connected to said top member and said bottom assembly distal from said stowage unit whereby said collapsible storage device forms an internal storage location with said top member and said bottom assembly being generally horizontally oriented, said stowage unit being adapted to receive items to be stored within said internal cavity when said collapsible storage device is assembled and said stowage unit being adapted to enclose and contain said first side member, said top member, and said bottom assembly within said internal cavity when said collapsible storage device is disassembled, further including at least one generally vertical wall, wherein said wall is removably connectable to said top member and said bottom assembly between said first side member and said stowage unit when said collapsible storage device is assembled, and wherein said stowage unit is adapted to enclose and contain said wall within said internal cavity when said collapsible storage device is disassembled.

12. The collapsible storage device of claim 11, further including at least one generally horizontal shelf, wherein said shelf is removably connectable to said stowage unit and said first side member when said collapsible storage device is assembled, and wherein said internal cavity is adapted to enclose and contain said shelf within said internal cavity when said collapsible storage device is disassembled.

13. The collapsible storage device of claim 11, further including at least one generally horizontal shelf, wherein said shelf is removably connectable to said stowage unit and said wall when said collapsible storage device is assembled, and wherein said stowage unit is adapted to enclose and contain said shelf within said internal cavity when said collapsible storage device is disassembled.

14. The collapsible storage device of claim 11, further including at least one generally horizontal shelf, wherein said shelf is removably connectable to said first side member and said wall when said collapsible storage device is assembled, and wherein said stowage unit is adapted to enclose and contain said shelf within said internal cavity when said collapsible storage device is disassembled.

15. The collapsible storage device of claim 11, wherein said bottom assembly includes first and second braces and at least one bottom panel, wherein said first and second braces are removably connectable to both said second end of said stowage unit and to said first side member, and said at least one panel is adapted to be removably mounted on said first and second braces between said stowage unit and said first side member, and wherein said stowage unit is adapted to enclose and contain said first and second braces and said at least one panel within said internal cavity when said collapsible storage device is disassembled.

16. The collapsible storage device of claim 15, further including a generally vertical wall and first and second bottom panels, wherein said wall is removably connectable to said top member and said first and second braces between said first side member and said stowage unit, and wherein said first bottom panel is adapted to being removably mounted on said first and second braces between said first side member and said wall, and said second bottom panel is adapted to being removably mounted on said first and second braces between said stowage unit and said wall, and wherein said stowage unit is adapted to enclose and contain said wall and said first and second bottom panels within said internal cavity when said collapsible storage device is disassembled.

17. The collapsible storage device of claim 11, wherein said stowage unit includes a door, said door being adapted to completely enclose said internal cavity.

18. The collapsible storage device of claim 11, wherein said stowage unit includes at least one wheel, said at least one wheel being located proximate said second end of said stowage unit and adapted to enable rolling movement of said collapsible storage device when disassembled.

19. The collapsible storage device of claim 18, wherein said bottom assembly conceals said at least one wheel when said collapsible storage device is assembled.

20. The collapsible storage device of claim 18, wherein said wheel includes a bracket having first and second flanges and said ends of said stowage unit include a corner, said first and second flanges being adapted to mate with said corner when said wheel is mounted to said stowage unit.

21. The collapsible storage device of claim 11, wherein said stowage unit includes at least one handle, said at least one handle being located proximate said first end of said stowage unit and being adapted to enable said top member to be removably connected to said handle when said collapsible storage device is assembled.

22. The collapsible storage device of claim 11, further including at least one removable stowage shelf, wherein said stowage shelf is adapted to being mounted within said internal cavity of said stowage unit when said collapsible storage device is assembled such that said stowage shelf can support items within said internal cavity, and wherein said stowage unit is adapted to enclose and contain said stowage shelf within said internal cavity when said collapsible storage device is disassembled.

23. A collapsible storage device comprising:
a first side member;
a top member;
a bottom assembly; and
a stowage unit, said stowage unit having first and second ends and an internal cavity between said first and second ends, said stowage unit further including at least one handle, at least one wheel, and a door, said door being adapted to enclose said internal cavity;
said stowage unit, said first side member, said top member, and said bottom assembly adapted to being removably connected together with said top member and said bottom assembly being removably connected to said first and second ends of said stowage unit and said first side member being removably connected to said top member and said bottom assembly distal from said stowage unit whereby said collapsible storage device forms an internal storage location with said top member and said bottom assembly being generally horizontally oriented, said stowage unit being adapted to receive items to be stored within said internal cavity when said collapsible storage device is assembled and said stowage unit being adapted to receive and contain said first side member, said top member, and said bottom assembly within said internal cavity when said collapsible storage device is disassembled, further including at least one generally vertical wall, wherein said wall is removably connectable to said ton member and said bottom assembly between said first side member and said stowage unit when said collapsible storage device is assembled, and wherein said stowage unit is adapted to receive and contain said wall within said internal cavity when said collapsible storage device is disassembled.

24. The collapsible storage device of claim 23, further including at least one generally horizontal shelf, wherein said shelf is removably connectable to said stowage unit and said first side member when said collapsible storage device is assembled, and wherein said stowage unit is adapted to receive and contain said shelf within said internal cavity when said collapsible storage device is disassembled.

25. The collapsible storage device of claim 23, further including at least one generally horizontal shelf having first and second shelf ends, wherein one of said first and second shelf ends is adapted to be removably connected to said wall when said storage device is assembled, and wherein said stowage unit is adapted to receive and contain said shelf within said internal cavity when said collapsible storage device is disassembled.

26. The collapsible storage device of claim 23, wherein said bottom assembly includes first and second braces and at least one bottom panel, wherein said first and second braces are removably connectable to both said second end of said stowage unit and to said first side member, and said at least one panel is adapted to being removably mounted on said first and second braces between said stowage unit and said first side member, and wherein said stowage unit is adapted to receive and contain said first and second braces and said at least one panel within said internal cavity when said collapsible storage device is disassembled.

27. The collapsible storage device of claim 26, further including a generally vertical wall and first and second bottom panels, wherein said wall is removably connectable to said top member and said first and second braces between said first side member and said stowage unit, and wherein said first bottom panel is adapted to being removably mounted on said first and second braces between said first side member and said wall, and said second bottom panel is adapted to being removably mounted on said first and second braces between said stowage unit and said wall, and wherein said stowage unit is adapted to receive and contain said wall and said first and second bottom panels within said internal cavity when said collapsible storage device is disassembled.

28. The collapsible storage device of claim 23, further including at least one removable stowage shelf, wherein said stowage shelf is adapted to being mounted within said internal cavity of said stowage unit when said collapsible storage device is assembled such that said stowage shelf can support items to be stored within said internal cavity, and wherein said stowage unit is adapted to receive and contain said stowage shelf within said internal cavity when said collapsible storage device is disassembled.

29. The collapsible storage device of claim 23, further including at least one trim piece, wherein said trim piece is removably mountable to said collapsible storage device when said collapsible storage device is assembled, and wherein said stowage unit is adapted to receive and contain said trim piece within said internal cavity when said collapsible storage device is disassembled.

30. The collapsible storage device of claim 23, wherein said bottom assembly conceals said at least one wheel when said collapsible storage device is assembled.

31. A collapsible storage device comprising:
a first member;
a second member;
a third member; and
a stowage unit, said stowage unit having first and second ends and an internal cavity between said first and second ends;
said stowage unit and said first, second, and third members adapted to being removably connected together with said second and third members being removably connected to said first and second ends of said stowage unit and said first member being removably connected to said second and third members distal from said stowage unit whereby said collapsible storage device forms an internal storage location, said stowage unit being adapted to receive items to be stored within said internal cavity when said collapsible storage device is assembled and said stowage unit being adapted to contain said first, second, and third members within said internal cavity when said collapsible storage device is disassembled, wherein said stowage unit includes at least one handle, said handle being adapted to aid in the transportation of said collapsible storage device when disassembled, and wherein said handle is located proximate one of said ends, and wherein one of said second and third members is removably mountable to said handle when said collapsible storage device is assembled.

32. The collapsible storage device of claim 31, wherein said stowage unit includes a sealing member, said sealing member being adapted to enclose said internal cavity.

33. The collapsible storage device of claim 32, wherein said sealing member is a door, said door being adapted to completely enclose said internal cavity.

34. The collapsible storage device of claim 31, wherein said stowage unit includes at least one wheel, said at least one wheel being located proximate one of said ends and adapted to enable rolling movement of said collapsible storage device when disassembled.

35. The collapsible storage device of claim 31, further including at least one generally horizontal shelf, wherein said shelf is adapted to being removably connected to said collapsible storage device within said internal storage location when said storage device is assembled, and wherein said stowage unit is adapted to contain said shelf within said internal cavity when said collapsible storage device is disassembled.

36. The collapsible storage device of claim 31, further including at least one generally vertical wall, wherein said wall is adapted to being removably connected to said collapsible storage device within said internal storage location when said storage device is assembled, and wherein said stowage unit is adapted to contain said wall within said internal cavity when said collapsible storage device is disassembled.

37. The collapsible storage device of claim 31, further including at least one removable stowage shelf, wherein said stowage shelf is adapted to being mounted within said internal cavity of said stowage unit when said collapsible storage device is assembled such that said stowage shelf can support items to be stored within said internal cavity, and wherein said stowage unit is adapted to contain said stowage shelf within said internal cavity when said collapsible storage device is disassembled.

* * * * *

UNITED STATES PATENT AND TRADEMARK OFFICE
CERTIFICATE OF CORRECTION

| | |
|---|---|
| PATENT NO. | : 7,464,946 B2 |
| APPLICATION NO. | : 11/099770 |
| DATED | : December 16, 2008 |
| INVENTOR(S) | : Christopher A. Marklevitz, Frederick A. Marklevitz and James L. Marlevitz |

It is certified that error appears in the above-identified patent and that said Letters Patent is hereby corrected as shown below:

<u>Column 14:</u>
Line 51, Claim 23, "ton" should be --top--.

<u>Column 16:</u>
Line 20, Claim 32, "scaling" should be --sealing--.

Signed and Sealed this

Twenty-ninth Day of September, 2009

David J. Kappos
*Director of the United States Patent and Trademark Office*